Oct. 23, 1951 W. G. H. FINCH 2,572,462

DRYING MECHANISM FOR ELECTROLYTIC FACSIMILE RECORDERS

Filed Nov. 20, 1946

INVENTOR.
WILLIAM G. H. FINCH
BY Ostrolenk + Faber
ATTORNEYS

Patented Oct. 23, 1951

2,572,462

UNITED STATES PATENT OFFICE 2,572,462

DRYING MECHANISM FOR ELECTROLYTIC FACSIMILE RECORDERS

William G. H. Finch, Newtown, Conn., assignor, by mesne assignments, to Pierce Company, Providence, R. I.

Application November 20, 1946, Serial No. 711,035

4 Claims. (Cl. 346—74)

My present invention relates to facsimile receivers and more particularly to a facsimile receiver adapted to mark the so-called moist or wet electrolytic sheets in accordance with received impulses to produce a complete image corresponding to the transmitted image.

My invention contemplates means for rapidly drying the moist or wet electroyltic sheet immediately after the facsimile marking has been made thereon.

There are may processes of electrical recording on chemically treated sheets. One of the well known types of sheets used for this purpose is a conductive paper sheet which is rendered conductive by a liquid electrolyte so that the paper just prior to recording is moist or damp. This makes possible the passage of electric current through the paper in order to provide a discoloration which will result in a facsimile marking.

The difficulty which arises, however, is that after the facsimile marking is made, the wet electrolyte in the paper tends to cause the mark to run or bleed so that the lines in the image or message which is received upon the facsimile paper are slightly blurred.

My invention is directed to the processes and apparatus for rapidly drying the sheet immediately after the facsimile marking is made so as to reduce or obviate the running or bleeding which would otherwise occur.

Thus the primary object of my invention is the provision of a novel facsimile receiver for use in connection with a moist or wet electrolytic sheet, the said receiver having means for rapidly drying the sheet to avoid running or bleeding of the facsimile marking immediately after the facsimile marking is made.

This and many other objects of my invention will become apparent from the following description and drawings in which.

Figures 1, 2:
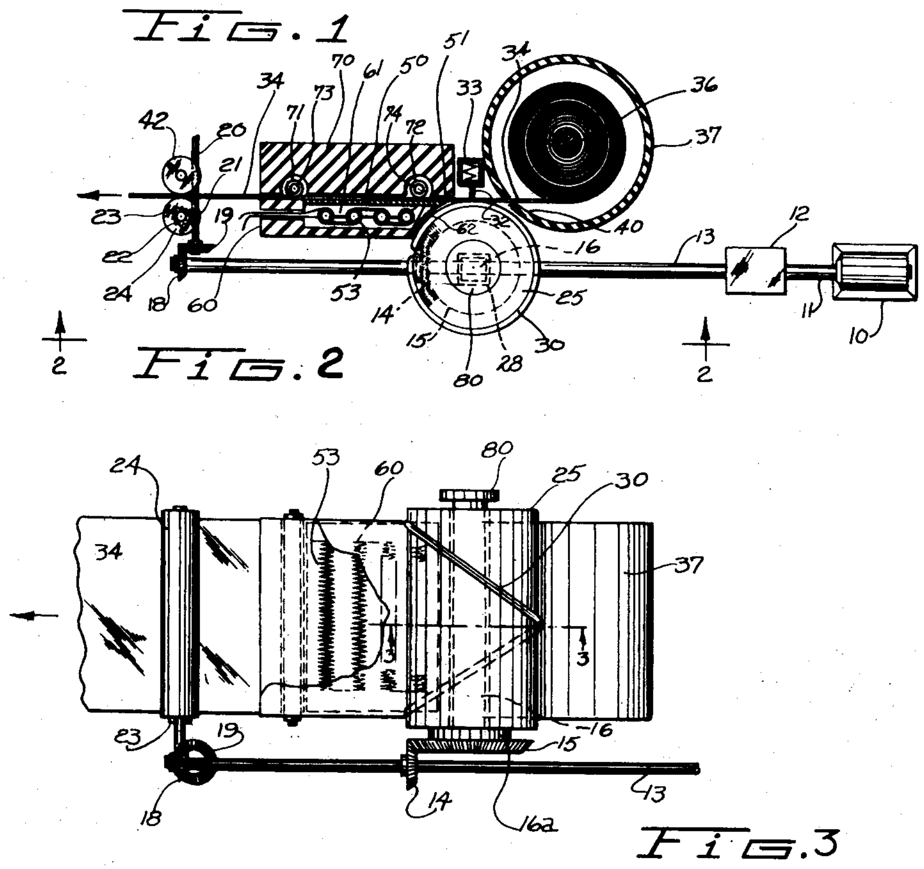
Figure 1 is a side view, partly in section of my novel facsimile recorder illustrating the drying means included therein.
Figure 2 is a bottom view partly cut away to show the heater element of my novel facsimile recorder taken from line 2—2 of Figure 1.

Referring now to the figures, the motor 10 drives its shaft 11 which through the gear reduction unit 12 drives the main drive shaft 13 of the facsimile unit. Shaft 13 carries the bevel gear 14 which meshes with and drives bevel gear 15 on the square shaft 16. Shaft 13 also carries the bevel gear 18 which meshes with and drives the bevel gear 19 on shaft 20. Shaft 20 carries the worm gear 21 which meshes with and drives the spiral gear 22 on shaft 23 of the draw roller 24.

Thus when the motor 10 is operated, bevel gear 14 rotates the drum 25 mounted on shaft 16 and bevel gear 18 rotates the draw roller 24 mounted on shaft 23.

Figures 3, 4:
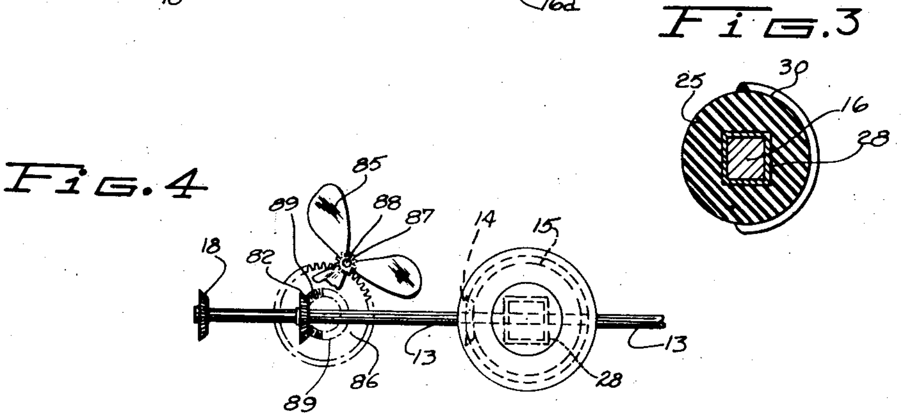
Figure 3 is a cross-sectional view of the recording drum taken from line 3—3 of Figure 2.
Figure 4 is a schematic view of a slight modification of the construction of Figures 1 and 2 to add a ventilating fan.

The drum 25 may be either a solid drum as shown in Figure 3 or a hollow drum; in either event the drum is provided with a square central opening 28 registering with the squared shaft 16 so that any rotation of shaft 16 results in rotation of the drum 25. Drum 25 is of insulating material.

The drum 25 is provided with a single raised 360° helical bead 30 of conductive material which cooperates with the knife bar 32 resiliently mounted in the knife bar supporting frame 33 to produce a scanning of the facsimile record sheet 34. The type of scanning operation here performed is that described in my prior application Serial No. 554,427, filed September 16, 1944, now U. S. Patent No. 2,413,962, which discloses the exact construction of the knife bar 32 and its support 33 which is herein shown and which discloses the method of cooperation between the knife bar 32 and the bead 30 on the drum 25.

The type of scanning operation thus produced is a well known scanning operation in which the rotation of the drum with respect to the stationary knife bar 32 which is parallel to the axis thereof and in contact with the bead 30 causes the line of contact to move down the drum once for each revolution of the drum. Thus for one hundred R. P. M. of the drum, one hundred scanning lines per minute are produced.

If the paper is drawn forward by the draw roller 24 at the rate of an inch per minute, then one hundred such scanning lines per minute are produced.

The paper 34 is mounted on any suitable reel indicated generally by the shaft 36 in the housing 37. The housing 37 and the reel 36 are so arranged that they may be readily withdrawn from the machine for loading a new reel 36 of paper 34 into the housing 37.

The housing 37 is preferably a moisture proof container having a perimeter or outer coating of heat insulating material. A slot 40 is provided through which the paper 34 is drawn out to pass between the knife bar 32 and the bead 30 on the drum 35 and then through the remainder of the apparatus to the draw roll 24.

The draw roll 24 is provided with an opposite pressure roll 42 in order to ensure that proper pressure is maintained of the paper 34 against the draw roll 24 so that the paper may be drawn out properly. The draw roll 24 may have substituted therefor an appropriate take up roll to wind up the recorded sheet or an appropriate take up roll may be provided after the draw roll 24 or a suitable blade may be provided after the draw roll 24 against which the recorded sheet may be torn off.

As previously pointed out, the paper 34 is in a moist or wet condition owing to the electrolyte absorbed thereby. Appropriate tempering means such as a heated roll may be provided just prior to the recording operation in order to ensure just the proper degree of moisture in the paper just before recording. Where it is desirable, the plate 50 hereinafter described may be extended beyond blade 32, being slotted to permit passage of blade 32; and the extension of plate 50 may act as the tempering means.

It becomes extremely important, however, that the paper be completely dry immediately after the recording operation so that no bleeding or running of the recorded facsimile impression will occur. For this purpose I have arranged the metallic hot plate 50 just beyond the recording unit, the said plate 50 extending very close to the point of contact between the recording bar 32 and the bead 30.

The plate 50 is located so that the paper 34 which moves tangentially to the drum at its point of contact to the bead will continue to move along the line of tangency while supported against the plate 50. Thus the plate 50 may clear the drum by a fraction of an inch more than the height of the recording bead 30. Where the bead is one-eighth of an inch thick, the edge 51 of the plate 50 may clear the bead by one-sixteenth of an inch or may clear the drum by three-sixteenths of an inch.

The plate 50 may be heated in any suitable maner as by the heating coil 53 immediately behind it. This heating coil may be thermostatically controlled in the well known and obvious manner to provide a predetermined degree of temperature. The setting of the thermostat may itself be automatically controlled by the degree of the humidity of the paper. For this purpose, the thermostat may be located immediately above the hot plate 50 where the heated and moistened air will rise and may be controlled by suitable hygroscopic members to vary its setting in accordance with the humidity of the air immediately above the hot plate.

By this means, the plate may be made warmer should the humidity rise or cooler when the humidity is lower. The hot plate is protected and supported in the insulating back plate 60 which is provided with the recess 61 for the heating coil. The back plate 60 may be curved at 62 so as to bring the insulation up as close as possible to the drum 25, and to cut off all of the heat which may be radiated from the plate 50 except that which is radiated from the surface of the plate 50 in contact with the paper 34.

The opposite side of the paper may be held in position by the insulating plate 70 provided with the recesses 71 and 72 for the pressure rollers 73 and 74.

The inner surface of plate 70 is spaced from the hot plate 50 by just sufficient width to permit the paper 34 to be pushed therebetween during the loading of the machine. The rollers 73 and 74 may be spring biased to press the paper against the hot plate, in which case appropriate well known means may be provided to release them to permit the paper to be threaded through. Or the rollers 73 and 74 may be connected by appropriate bevel gear arrangements to the drive shaft 13 so that they will be driven rollers and the paper may be threaded through simply by inserting the free end thereof up to the roller 74 and then by turning shaft 13 to draw the paper through.

The insulating plate 70 is carried right up to the support 33 for the knife bar 32 to obviate heat conduction at that point.

The mounting of the drum 25 by means of its square opening 28 on the squared shaft 16 facilitates the threading through of the strip 34. In order to perform this operation, the drum 25 is simply lifted up and off by grasping the knob 80 at the top thereof. This provides sufficient clearance for the paper to be drawn from the slot 30 past the knife support 33 and into the space between the hot plate 50 and the insulating plate 70. The paper is then threaded through further as above described, and the drum 25 is replaced.

The lower end of the shaft 16 is expanded as shown at 16*a* of Figure 2 to provide an appropriate brush contact surface so that current may flow from the knife blade 32 to the bead 30 and through the expanded section 16*a* of squared shaft 16 to an appropriate brush contact to complete the circuit through the paper.

Where necessary, in order to temper the paper to a predetermined moisture content before recording, the hot plate 50 may be extended beyond the bar 33, being provided with a slot for the bar to pass therethrough and the paper may thus be tempered. The heat generated within the enclosure by the hot plate itself provides a sufficiently warm atmosphere, however, to temper the paper appropriately just prior to recording.

The paper, when it comes in direct contact with the hot plate after recording, is then rapidly dried. If necessary, as shown in Figure 4, ventilating means for rapid removal of the heated and moistened air may be provided by a fan 85 beneath the hot plate 50 driven by gear 86 which meshes with the gear 87 on the shaft 88 of the fan.

Gear 86 is connected to or may be made a part of the bevel gear 89 which in turn is driven by bevel gear 82 on shaft 13.

In the foregoing I have described my invention solely in connection with an illustrative embodiment thereof. Since many variations and modifications of my invention should now be obvious to those skilled in the art, I prefer to be limited, not by the specific disclosure herein contained, but only by the appended claims.

I claim:

1. In combination with a facsimile recorder including a recording mechanism capable of producing a record on a moist chemically treated recording medium moved relative to said recording mechanism, the improvement comprising a dryer mounted on said facsimile recorder for removing moisture from said recording medium subsequent to recordation thereon, said dryer comprising a substantially flat metallic plate mounted closely adjacent to the point of recording of said recording mechanism and extending along the path of movement of said recording medium away from said recording mechanism, means for heating said metallic plate throughout its length, means for maintaining said recording medium in contact with said metallic plate, a heat insulating plate backing said metallic plate, and an additional heat insulating plate mounted parallel to the flat surface of said metallic plate and spaced therefrom a distance sufficient to permit movement of said recording medium between said metallic plate and said additional heat insulating plate.

2. In combination with a drum type facsimile recorder including a recording mechanism capable of producing a record on a moist chemically treated recording medium moved relative to said recording mechanism, the improvement comprising a dryer mounted on said facsimile recorder adjacent to said drum for removing moisture from said recording medium subsequent to recordation thereon, said dryer comprising a substantially flat metallic plate mounted closely adjacent to the point of recording of said recording mechanism and extending along the path of movement of said recording medium away from said recording mechanism, means for heating said metallic plate throughout its length, means for maintaining said recording medium in contact with said metallic plate, a heat insulating plate backing said metallic plate and extending up to the drum of said recording mechanism and being curved on an arc concentric with said drum at its point of adjacency to said drum, and an additional heat insulating plate mounted parallel to the flat surface of said metallic plate and spaced therefrom a distance sufficient to permit movement of said recording medium between said metallic plate and said additional heat insulating plate.

3. In combination with a facsimile recorder including a recording mechanism capable of producing a record on a moist chemically treated recording medium moved relative to said recording mechanism, the improvement comprising a dryer mounted on said facsimile recorder for removing moisture from said recording medium subsequent to recordation thereon, said dryer comprising a substantially flat metallic plate mounted closely adjacent to the point of recording of said recording mechanism and extending along the path of movement of said recording medium away from said recording mechanism, means for heating said metallic plate throughout its length, means for maintaining said recording medium in contact with said metallic plate, a heat insulating plate mounted parallel to the flat surface of said metallic plate and spaced therefrom a distance sufficient to permit movement of said recording medium between said metallic plate and said heat insulating plate, and ventilating means for removing heated air from said recording mechanism.

4. In combination with a drum type facsimile recorder including a recording mechanism capable of producing a record on a moist chemically treated recording medium moved relative to said recording mechanism, the improvement comprising a dryer mounted on said facsimile recorder adjacent to said drum for removing moisture from said recording medium subsequent to recordation thereon, said dryer comprising a substantially flat metallic plate mounted closely adjacent to the point of recording of said recording mechanism and extending along the path of movement of said recording medium away from said recording mechanism, means for heating said metallic plate throughout its length, means for maintaining said recording medium in contact with said metallic plate, a heat insulating plate backing said metallic plate and extending up to the drum of said recording mechanism and being curved on an arc concentric with said drum at its point of adjacency to said drum, an additional heat insulating plate mounted parallel to the flat surface of said metallic plate and spaced therefrom a distance sufficient to permit movement of said recording medium between said metallic plate and said additional heat insulating plate, and ventilating means for removing heated air from said recording mechanism.

WILLIAM G. H. FINCH.

REFERENCES CITED

The following references are of record in the file of this patent:

UNITED STATES PATENTS

| Number | Name | Date |
|---|---|---|
| 1,878,319 | Pinder | Sept. 20, 1932 |
| 1,983,995 | Reinhardt | Dec. 11, 1934 |
| 2,007,551 | Tompkins | July 9, 1935 |
| 2,226,871 | Nicholas | Dec. 31, 1940 |
| 2,227,109 | Shankweiler | Dec. 31, 1940 |
| 2,352 444 | Miller | June 27, 1944 |
| 2,384,722 | Blain | Sept. 11, 1945 |
| 2,391,765 | Artzt | Dec. 25, 1945 |